(12) United States Patent
Capecelatro et al.

(10) Patent No.: US 12,166,741 B1
(45) Date of Patent: Dec. 10, 2024

(54) DEVICE NAMING IN PREMISES CONTROL SYSTEMS USING AUTOMATED DEVICE DISCOVERY

(71) Applicant: Josh.ai, Inc., Denver, CO (US)

(72) Inventors: Alex Nathan Capecelatro, Los Angeles, CA (US); Timothy Earl Gill, Denver, CO (US); Derek Murphy, Highlands Ranch, CO (US)

(73) Assignee: Josh.ai, Inc., Denver, CO (US)

( * ) Notice: Subject to any disclaimer, the term of this patent is extended or adjusted under 35 U.S.C. 154(b) by 0 days.

(21) Appl. No.: 17/722,250

(22) Filed: Apr. 15, 2022

Related U.S. Application Data

(60) Provisional application No. 63/176,721, filed on Apr. 19, 2021.

(51) Int. Cl.
*H04L 41/22* (2022.01)
*H04L 41/12* (2022.01)
*H04L 61/3015* (2022.01)
*H04L 41/0806* (2022.01)

(52) U.S. Cl.
CPC .......... *H04L 61/3015* (2013.01); *H04L 41/12* (2013.01); *H04L 41/22* (2013.01); *H04L 41/0806* (2013.01)

(58) Field of Classification Search
CPC ......... H04L 67/12; H04L 41/12; H04L 67/51; H04L 12/2809; H04L 12/2832; H04L 12/2803; H04L 12/2807; H04L 12/2836
See application file for complete search history.

(56) References Cited

U.S. PATENT DOCUMENTS

| | | | |
|---|---|---|---|
| 10,735,521 B1* | 8/2020 | Woodhead | H04L 67/1001 |
| 11,361,764 B1* | 6/2022 | Zhao | G06F 40/30 |
| 2015/0382198 A1* | 12/2015 | Kashef | H04L 67/303 |
| | | | 726/5 |
| 2019/0212730 A1* | 7/2019 | Jones | G05D 1/0274 |
| 2019/0215178 A1* | 7/2019 | Pynes, II | H04L 12/2827 |
| 2020/0342014 A1* | 10/2020 | Kumar | G06F 16/338 |
| 2021/0218571 A1* | 7/2021 | Ansari | H04M 15/705 |
| 2022/0139573 A1* | 5/2022 | Sharifi | G06F 16/3329 |
| | | | 709/223 |

* cited by examiner

*Primary Examiner* — Tom Y Chang
(74) *Attorney, Agent, or Firm* — Van Pelt, Yi & James LLP

(57) ABSTRACT

One or more network communications to discover one or more controllable devices on a network with which a premises automation system is associated is sent automatically. A set of one or more controllable devices on the network is determined based at least in part on a response received from said one or more network communications. An assigned name that is unique within the premises automation system is assigned automatically to each of said set of one or more controllable devices.

26 Claims, 16 Drawing Sheets

FIG. 4

| SETTINGS | | DEVICES  SHOW ADVANCED  402 | | | 406 | 408 | |
|---|---|---|---|---|---|---|---|
| SYSTEM SETTINGS | | ID | TYPE | MANUFACTURER | MODEL | ASSIGNED NAME | ROOM | HUB |
| AUTH DEVICES | | 20 | Camera | Foscam | | Foscam camera | Front Yard | |
| DEVICE HISTORY | | 38 | IR Blaster | Global Caché | iTachWF2iR | iTachWF2iR (00:0c:1e:02:60:1d) ←410a | Unassigned | |
| EDIT JUDY SMITH | | 50 | Custom Input | Josh AI | | Basement Apple TV | Basement | |
| EDIT YOUR PROFILE | | 51 | Custom Input | Josh AI | | Basement DVD | Basement | |
| DELETED DEVICES | | 77 | Custom Input | Josh AI | | Bedroom Apple TV | Master Bedroom | |
| SYSTEM BACKUP | | 52 | Manual TV | Josh AI | | Family Room TV | Family Room | |
| SUPPORT | | 208667974 | Microphone | Josh.ai | Josh Micro | Clear Micro | Basement | ←404 |
| DEALER RESOURCES | | 208669490 | Microphone | Josh.ai | Josh Micro | White Micro | Family Room | |
| REQUEST A FEATURE | | 208680856 | Microphone | Josh.ai | Josh Micro | Black Micro | Kitchen | |
| HELP.JOSH.AI | | 8 | Hub | Lutron | | Lutron Caseta Smart Bridge | Tech closet | |
| EMAIL SUPPORT | | 11 | Light | Lutron | | Basement Front Area | Basement | Lutron Caseta Smart Bridge |
| | | 12 | Light | Lutron | | Basement Back Area | Basement | Lutron Caseta Smart Bridge |

| | | | | |
|---|---|---|---|---|
| 43 | Remote | Lutron | PJ2-3BRL-GXX-X01 | Pico 1 | Basement | Lutron Caseta Smart Bridge |
| 44 | Remote | Lutron | PJ2-3BRL-GXX-X01 | Pico 2 | Basement | Lutron Caseta Smart Bridge |
| 27 | Hub | Philips | Philips hue bridge 2015 | Philips hue (10.0.0.146) | Unassigned | 410b |
| 28 | Light | Philips | LCA003 | Front Lamp | Family Room | Philips hue (10.0.0.146) |
| 29 | Light | Philips | LCA003 | Floor Lamp | Family Room | Philips hue (10.0.0.146) |
| 30 | Light | Philips | LCA003 | Back Lamp | Family Room | Philips hue (10.0.0.146) |
| 34 | Light | Philips | LCA003 | Garage Light | Front Yard | Philips hue (10.0.0.146) |
| 35 | Light | Philips | LCA003 | Entry Light | Front Yard | Philips hue (10.0.0.146) |
| 45 | Streaming Box | Roku | Roku Ultra | Family Room Roku | Family Room | |
| 46 | Streaming Box | Roku | Roku Ultra | Bedroom Roku | Master Bedroom | |
| 47 | Streaming Box | Roku | Roku Ultra | Basement Roku | Basement | |
| 48 | Music Player | SONOS | Sonos Beam | Family Room Sonos Beam | Family Room | |
| 49 | Music Player | SONOS | Sonos Beam | Basement Sonos Beam | Basement | |
| 2 | Musicplayer | SONOS | Sonos One | Studio Sonos One | Studio | |

FIG. 4 (Cont.)

| | | | | | | | | |
|---|---|---|---|---|---|---|---|---|
| 41 | TV | LG | 49SK8000PUA | Kitchen TV | Kitchen | 34411623-26d5-cfe1-3614-438aec5eb472 | 78:5d:c8:79:96:4a | online | (PING) (DELETE) |
| 42 | TV Tuner | LG | 49SK8000PUA | [LG] WebOS TV SK8000PUA TV Tuner | Unassigned | Kitchen TV | 34411623-26d5-cfe1-3614-438aec5eb472 -tv-tuner | | online | (DELETE) |
| 26 | Hub | Lutron | Lutron Caseta Smart Bridge | Lutron Caseta Smart Bridge | Tech Closet | | 10.0.5.77 | 7c:66:9d:0e:2a:51 | online | (DELETE) |
| 59 | Hub | Lutron | | Lutron Hub | Tech Closet | | 10.0.5.107 | 00:0f:e7:03:d8:ed | online | (DELETE) |
| 28 | Light | Lutron | PD-3PCL-WH | Deleted: Table Lamp | Office | Lutron Caseta Smart Bridge | /zone/6 | | online | (RESTORE) |
| 61 | Light | Lutron | | Desk Lamp | Office | Lutron Hub | 12 | | online | (PING) (DELETE) |
| 62 | Light | Lutron | | Living Room Overhead Light | Living Room | Lutron Hub | 11 | | online 702 | (PING) (DELETE) |
| 63 | Light | Lutron | | Library Overhead | Library | Lutron Hub | 10 | | online | (PING) (DELETE) |
| 64 | Light | Lutron | | Kitchen Overhead | Kitchen | Lutron Hub | 9 | | online | (PING) (DELETE) |

AUTH DEVICES — 901

- AUTH DEVICES
- ✓ DISH SET TOP BOX
- ✓ ECOBEE
- ✓ JOSH SYSTEM OVERVIEW
- ✓ LG TV
- ✓ LUTRON CASETA
- ✓ LUTRON RADIORA2
- ✓ PANDORA
- ✓ PHILIPS HUE
- ✓ SAMSUNG TV
- ✓ SOMFY HUB
- ✓ SONOS
- ✓ SONY TV

AUTH DEVICES — SONOS — 902

HOW TO AUTHORIZE ‹

SONOS AUTH
Use the SONOS app to add music services to your SONOS account. The following services are supported by Josh: Spotify, Apple Music, Tidal, iHeartRadio, Tunein, SiriusXM, and Pandora. Once authorized within the SONOS app, your music services will show up here.
(Note, Pandora will still need to be authorized using the form below)

PANDORA AUTHORIZATION
Put in your Pandora account credentials here.

YOUR SONOS SERVICES SUPPORTED BY JOSH — 904

((Siriusxm)) SATELLITE RADIO   ≋ Spotify   ✸ TIDAL
pandora   iHeartRADIO   ♫ MUSIC
tunein Based on your services, Josh will be able to find both specific artists, albums, and tracks, and also radio stations and genres.

If this list of services is inaccurate for Sonos players, please use the button below to refresh.

(REFRESH)

AUTHORIZED DEVICES ‹

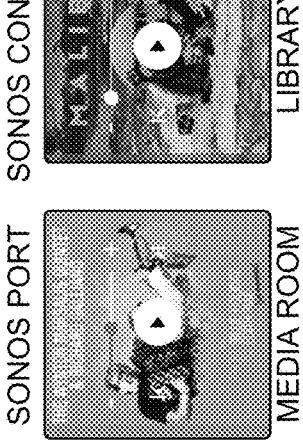

MEDIA ROOM
SONOS PORT

MEDIA ROOM

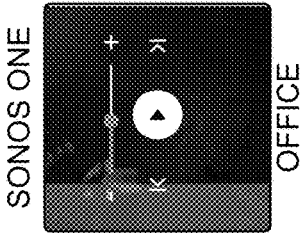

LIBRARY
SONOS CONNECT

LIBRARY

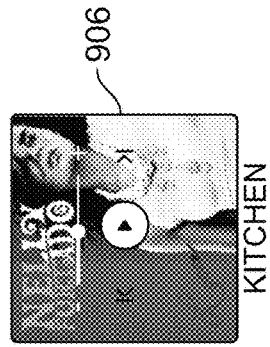

OFFICE
SONOS ONE

OFFICE

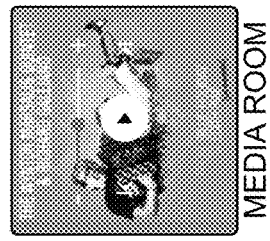

KITCHEN
SONOS ONE — 906

KITCHEN

FIG. 9

DEVICE NAMING IN PREMISES CONTROL SYSTEMS USING AUTOMATED DEVICE DISCOVERY

CROSS REFERENCE TO OTHER APPLICATIONS

This application claims priority to U.S. Provisional Patent Application No. 63/176,721 entitled DEVICE NAMING IN HOME CONTROL SYSTEMS USING AUTOMATED DEVICE DISCOVERY filed Apr. 19, 2021 which is incorporated herein by reference for all purposes.

BACKGROUND OF THE INVENTION

One use for technology is to establish a system of control. In premises automation, for example home automation, a system controls various aspects of the premises such as lighting, entertainment, and heating, ventilation and air conditioning (HVAC) based in part on user input. As time and technology advances, more devices are controllable using premises automation. Controlling a premises automation system and/or adding devices may be overwhelming, expensive, and/or time consuming. It would be useful to have easier ways to maintain a system of control.

BRIEF DESCRIPTION OF THE DRAWINGS

Various embodiments of the invention are disclosed in the following detailed description and the accompanying drawings.

FIG. 4 is a screenshot illustrating an example of a portal to review assigned names.

FIG. 7 is a screenshot illustrating an example of a portal to associate an assigned name to a device.

FIG. 9 is a screenshot illustrating an example of a portal to authorize a streaming device with an assigned name.

DETAILED DESCRIPTION

Figure 1:
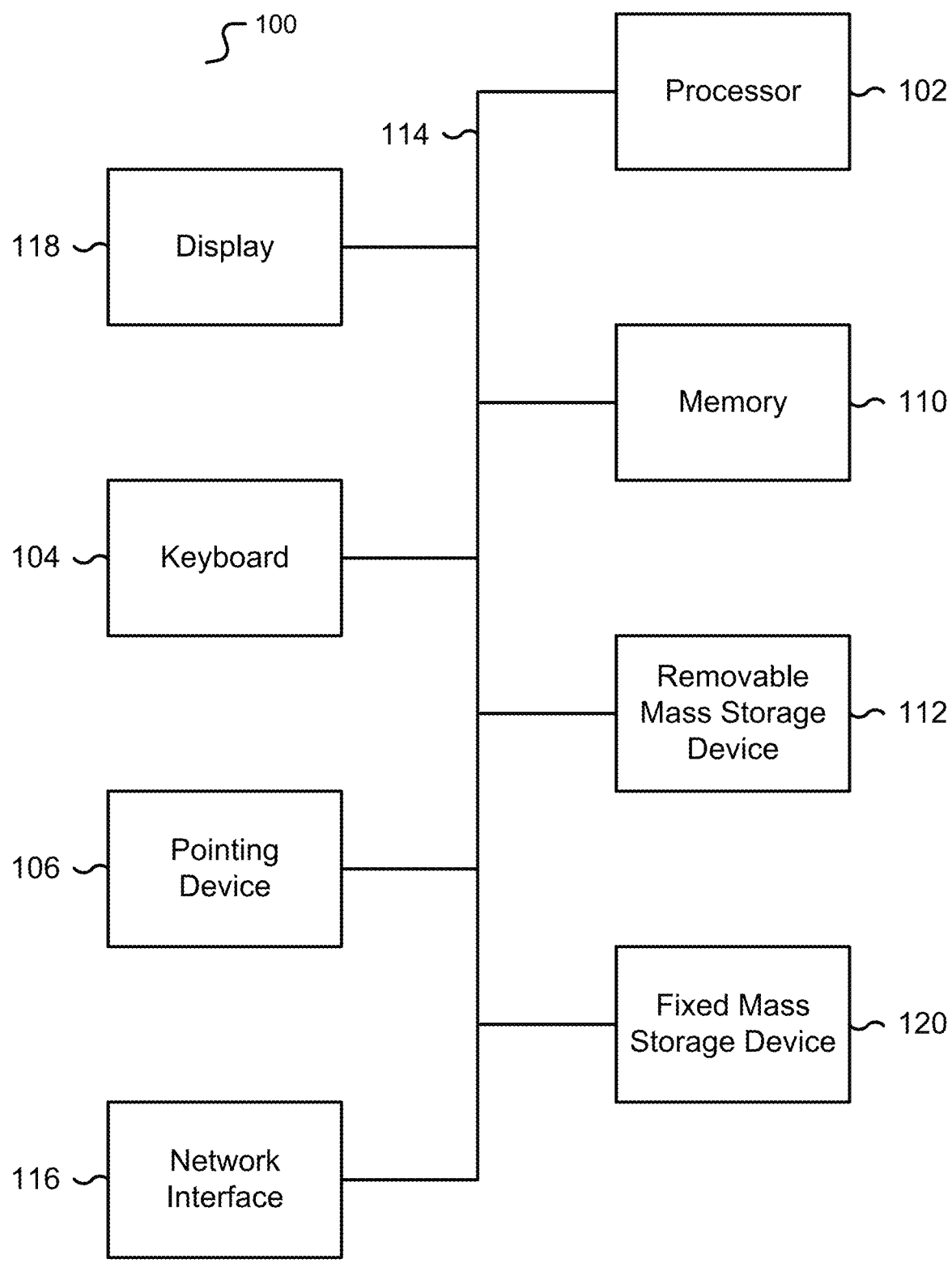
FIG. 1 is a functional diagram illustrating a programmed computer/server system for device naming in premises control systems using automated device discovery in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An improvement for a user-facing system is making it simpler in operation and interaction. A premises control system for controlling devices within the premises such as a home is such a user-facing system. Minimizing user programming and/or user configuration for a premises control system design thus improves said design, with a plug and play system being a goal. Automated device discovery is such an improvement, eliminating the need for a user manually adding devices into the system, requiring a user's time and avoiding errors based on a user's mistakes.

Automatically discovering premises control devices is disclosed. In one embodiment, devices are pulled in automatically, and interaction by the user is allowed to improve discovery, for example by confirming the discovered device or adding additional details for it. Further configuration is made available for more complicated subsystems, like video switching, streaming flow, or for adjustment based on user-preference, such as room placement and name aliasing.

Automatically assigning names for discovered premises control devices is disclosed. In a premises control system offering natural language input, for example by voice and/or text, device names may be more important. For example, when selecting a particular device in an app's graphical user interface (GUI), the user may search for that device by its name. When controlling devices via natural language, for example by voice, it may be intuitive to refer to devices by name. Automatically assigning names that may be used to uniquely identify devices in a natural manner is disclosed. In one embodiment, the premises control system provides names that are both unique across the premises control system and user friendly, including by being intuitive for current and future users in how to refer to the devices/rooms via natural language and/or in a natural manner.

Assigning unique device names is an improvement because it prevents ambiguities. In a GUI, devices with unique names help a user correctly identify a specific device when using the premises control system using natural language. In voice control, ambiguity is more common. This is because voice control additionally needs to determine user intent, and there may be similar commands with different intents. As an example, a voice control system may allow the following commands:

Turn on the <device name>, for example "turn on the fireplace"

Turn on the <device type>, for example "turn on the lights"

Turn on the <room name>, for example "turn on the den"

These commands may be ambiguous if a device name is allowed to clash with room names or device types, for example a fireplace named "lights". In one embodiment, these ambiguities are solved by enforcing uniqueness not just amongst other device names, but across the entire premises control system, taking into account rooms and common device types.

In one embodiment, uniqueness is solved by appending a universally unique identifier (UUID) to each name, but this may come with the cost of a degraded user experience, such as a non-intuitive experience. For example, calling the fireplace "fireplace 21" is unique yet not easy for a user or a user's family to remember. It is also the responsibility of the premises control system to maintain user friendly names to ensure they remain presentable in a GUI, intuitive and/or memorable, and a user may easily interact with them via voice control.

In one embodiment, the home/premises control system may be exhaustively programmed, wherein it may be the responsibility of the user/programmer to ensure that device names are unique and user friendly. Such a manual process may be time consuming, costly, and/or error-prone.

In a preferred embodiment, a premises control system leverages "automated device discovery" described herein as any automated technique to identify and/or provision a device that is new to the premises and/or new to the premises control system, and make it work with the premises control system, such as: scanning the network for new devices; sending out various search requests to see which devices respond; and/or identifying/interrogating each device that is found to determine its manufacturer, model, type of device, unique ID, name, room/floor and/or other characteristics.

Using automated device discovery so that device naming resolution and/or assignment is performed automatically/algorithmically is disclosed. Such an assignment brings an improvement because it eliminates the need for extensive control system programming.

FIG. 1 is a functional diagram illustrating a programmed computer/server system for device naming in premises control systems using automated device discovery in accordance with some embodiments. As shown, FIG. 1 provides a functional diagram of a general purpose computer system programmed to provide device naming in premises control systems using automated device discovery in accordance with some embodiments. As will be apparent, other computer system architectures and configurations can be used for device naming in premises control systems using automated device discovery.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data, and objects used by the processor 102 to perform its functions, for example, programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read-only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storages 112, 120 generally store additional programming instructions, data, and the like that typically are not in active use by the processor 102. It will be appreciated that the information retained within mass storages 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio input device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification, "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous and/or heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
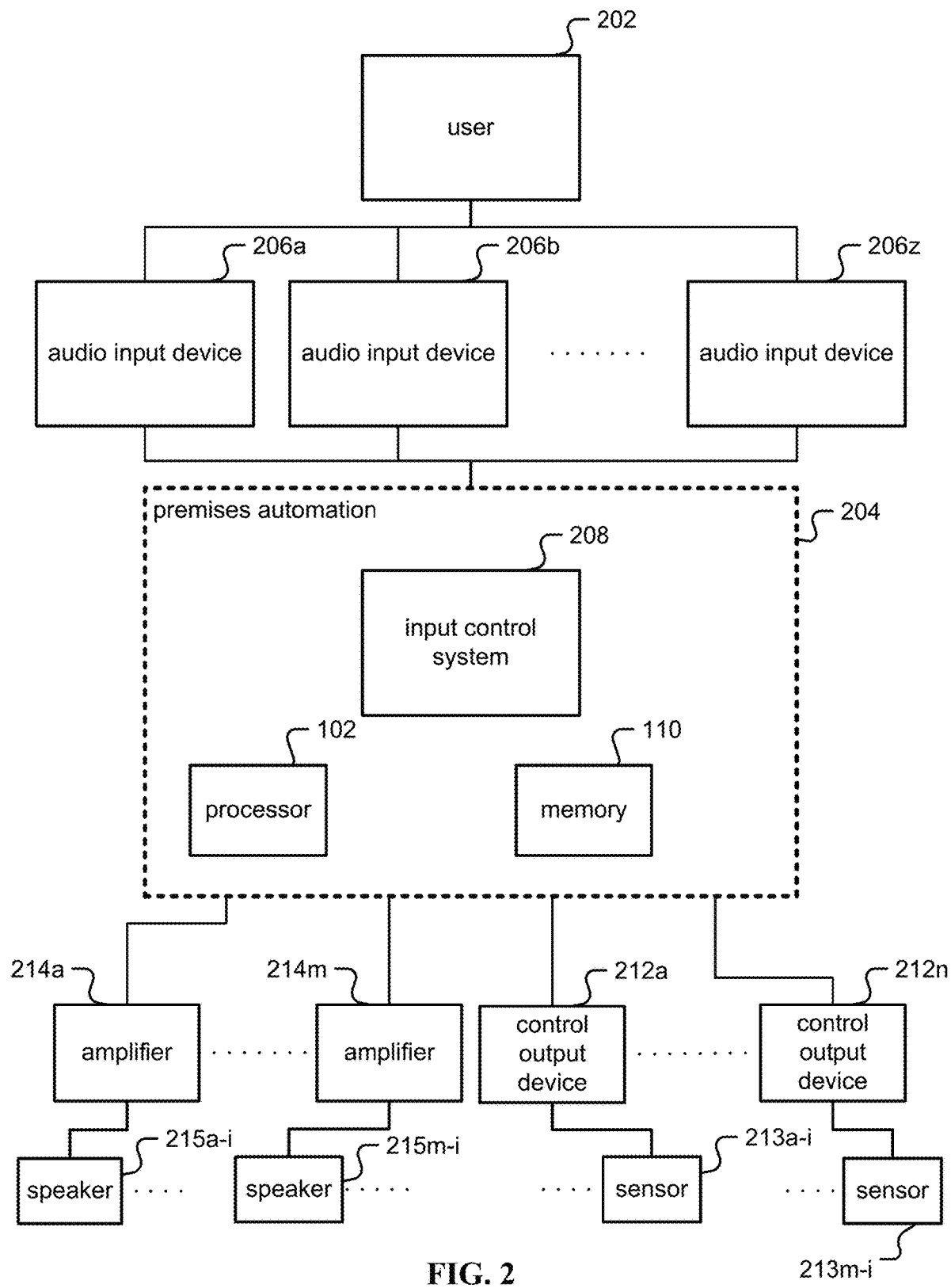
FIG. 2 is a block diagram illustrating an embodiment of a system for premises automation.

FIG. 2 is a block diagram illustrating an embodiment of a system for premises automation. User (202) is coupled to premises automation system (204), either through distributed sensor input devices (206), for example, audio input devices, here shown with three devices (206a), (206b), and (206z), if by way of speech, or directly to the input control system (208) if by way of written word, for example, by typing or texting on an associated app.

In one embodiment, premises automation system (204) is a computer system as shown in FIG. 1 and includes processor (102) and memory (110). In one embodiment, the premises automation system (204) is a mobile phone, computer, or dedicated smart home device. Without limitation, throughout this specification the dedicated smart home device referenced herein as a "core" device is illustrated as the premises automation system (204). In one embodiment, a physical phone, touchscreen, swipe-based keyboard, and/or virtual keyboard (104) is included for typing or texting. The audio input device(s) (206) may be coupled and/or part of the input control system (208) as well.

After interpreting programming, the input control system (208) may be coupled to one or more control output devices (212), here shown with more than two devices (212a), . . . , (212n). The control output devices (212) may be a single smart home hub (212a) and/or may include additional smart home devices for direct control. One or more other sensors (213) may be part of any control output device (212).

To cue feedback from premises automation core (204) to the user giving speech commands to one or more of the audio input devices (206), an existing distributed network of speakers (215), which may be external speakers being external to the audio input devices (206), may be used by interfacing with an existing set of associated amplifiers (214). Premises automation core (204) may also playback music and/or television/media audio through the existing set of speakers and/or smart speakers (215).

Figure 3A:
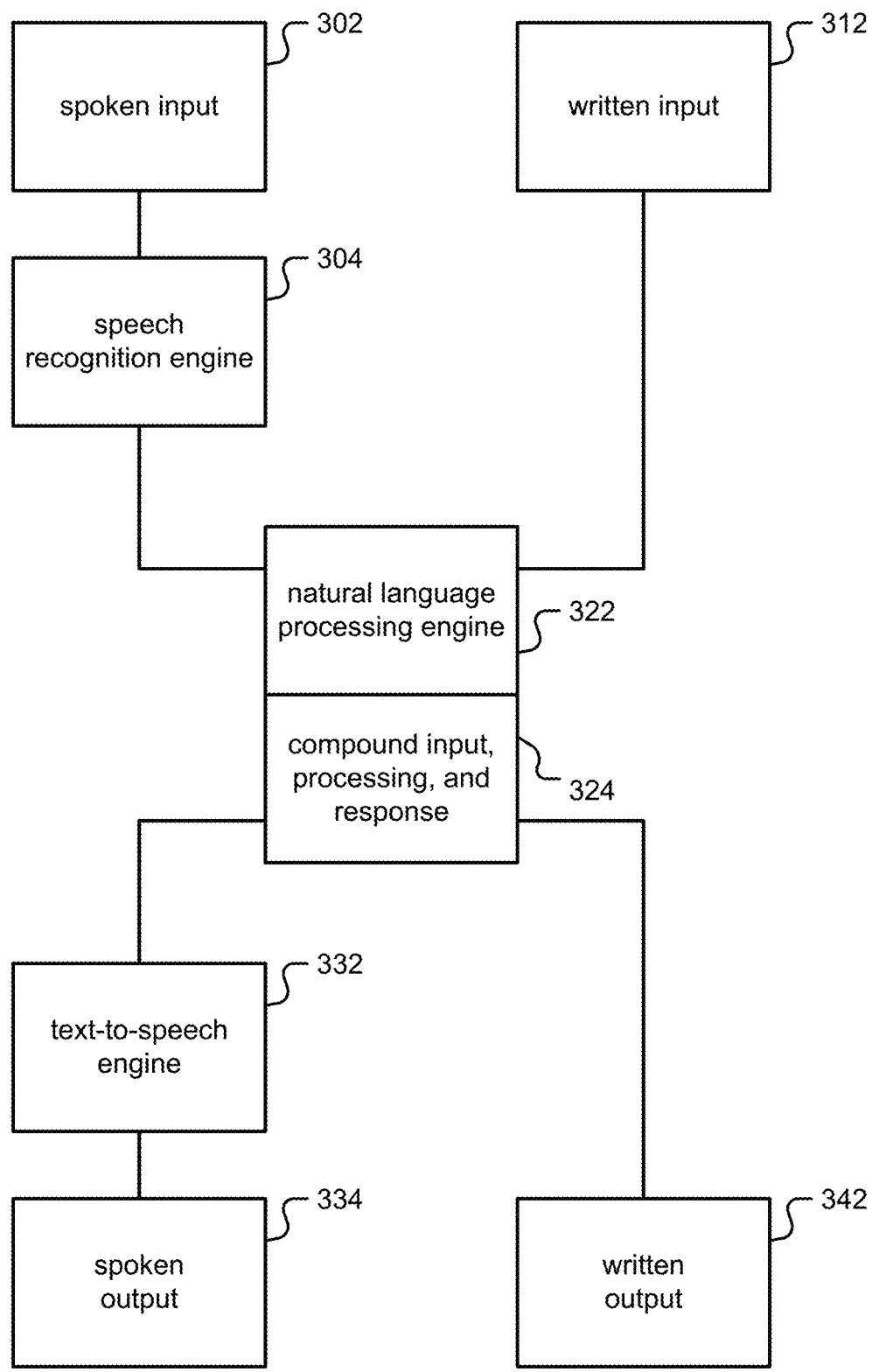
FIG. 3A is a block diagram illustrating an embodiment of a system for complex input speech and written processing.

FIG. 3A is a block diagram illustrating an embodiment of a system for complex input speech and written processing. In one embodiment, the system of FIG. 3A is at least part of the premises automation system (204) and/or control output device (212a) in FIG. 2A.

As FIG. 3A illustrates, input may be spoken and/or written and is referred to herein as an "utterance", and output may be spoken and/or written. Spoken input (302) is processed by a speech recognition engine (304) before being passed to the natural language processing engine (322). Written input (312) may be processed directly by the natural language processing engine (322) using for example a physical keyboard, screen keyboard, swipe keyboard, and/or speech-to-text entry. In one embodiment, written input (312) may correct, add, edit, and/or delete the resultant input from spoken input (302) and speech recognition engine (304).

Note that in some cases, the spoken input (302) and/or written input (312) may have little or no punctuation, capitalization, and/or proper nouns recognized. Natural language processing engine (322) applies rules and couples the system for complex/compound input, processing, and response (324), referred to herein as "intent". User notification of responses includes written output (342) from system (324), and may include a text-to-speech engine (332) to provide spoken output (334) as well.

Figure 3B:
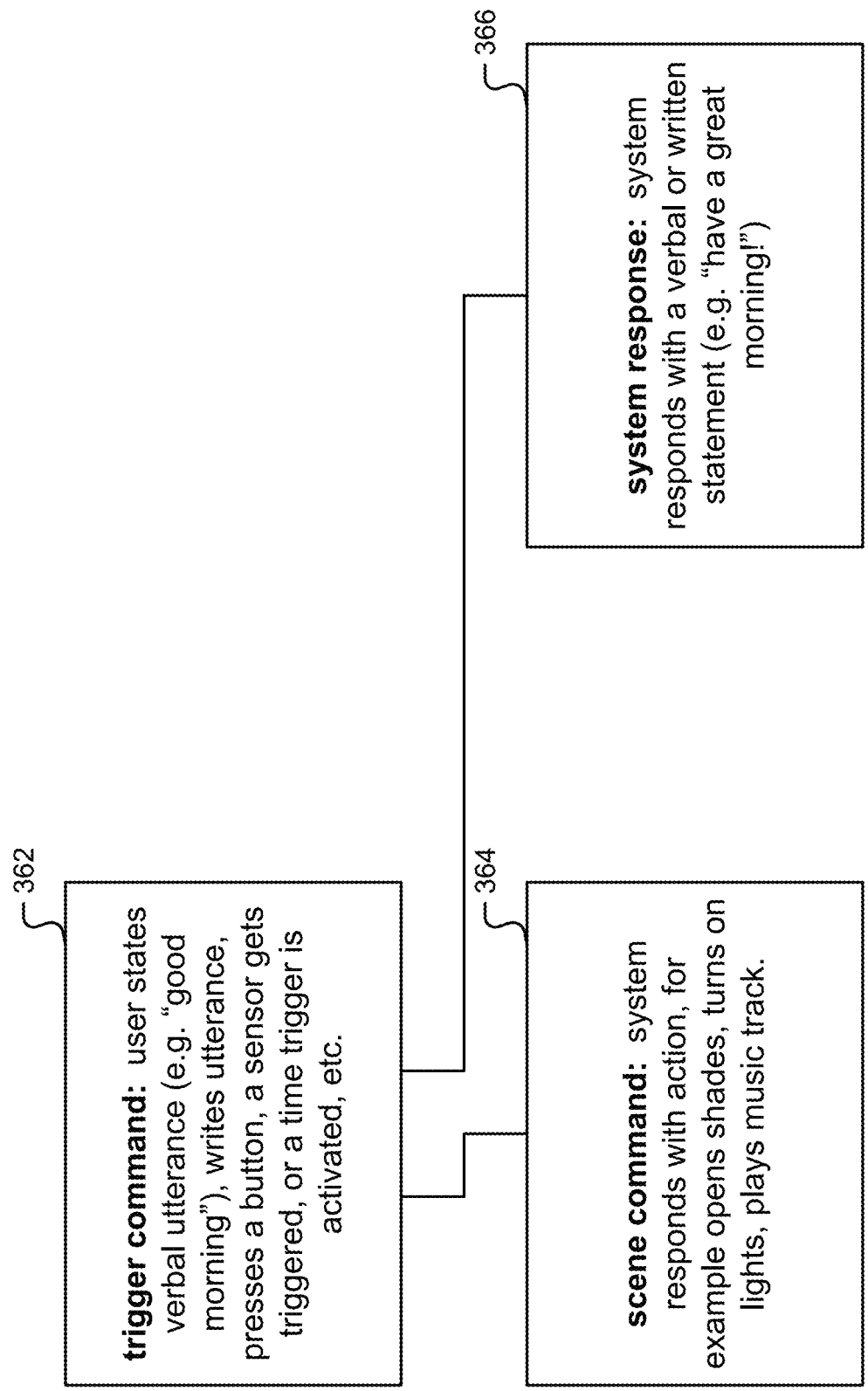
FIG. 3B is an illustration of a trigger and corresponding scene command.

FIG. 3B is an illustration of a trigger and corresponding scene command. In one embodiment, the illustration of FIG. 3B is carried out by the system (204) of FIG. 2A.

Trigger command (362) is an action that triggers a scene. In the example of FIG. 3B, the action includes: a voice command, for example, a user that says "Good morning"; a button press, for example, a user that presses a button titled "Morning"; a triggered sensor; and/or a triggered time, for example, based on a schedule. In each case the trigger indicates a "begin good morning scene" intent.

After the system is triggered (362), the system may optionally respond with a "scene" command (364). Examples given in FIG. 3B include opening the shades, turning on the lights, and playing a musical track. A scene command, also referred to herein as a "premises automation scene," is a convenient way to refer to one or more aspects of premises automation. For example, a "good morning" command may include opening the shades, turning on the lights, and playing a musical track suitable for mornings because the user prefers to start their morning with these aspects of premises automation. After the system is triggered (362), a system response (366) may optionally be issued by responding with a written or verbal output, for example, "Have a great morning!"

In one embodiment, device naming is based at least in part on data available for device discovery. Typically, devices in home/premises control automation may incorporate one or more common mechanisms for automated device discovery. These include AMX (AMX by Harmon), ONVIF (Open Network Video Interface Forum), mDNS (multicast Domain Name Service), and SSDP (Simple Service Discovery Protocol). There are also manufacturer specific protocols that are functionally similar to these more established protocols. Some discovery protocols may rely on UDP broadcast/multicast on the local network. Finally, to discovery devices in the event they do not have any other standard discovery protocol and/or an unknown discovery protocol, the premises control system may use ARP (Address Resolution Protocol) manufacturer lookup. As referred to herein "ARP manufacturer lookup" comprises an ARP scan, to analyze every MAC (Media Access Control) address and/or IP (Internet Protocol) address and map MAC addresses to a manufacturer/model of device.

As there is currently no de facto or de jure standard for automated device discovery, the data received on discovery may vary. That is, the device may provide characteristics, typically some combination of name, manufacturer, model, ID, and/or room/location. In one embodiment, the premises control system uses these responsive discovered characteristics to infer other discovered characteristics such as a device type, for example by using a dynamically updated lookup table. In one embodiment, these discovered characteristics for a controllable device are incorporated algorithmically to at least in part assign a device name used within the premises control system that is unique across the system and intuitive/natural/user-friendly.

FIG. 4 is a screenshot illustrating an example of a portal to review assigned names. In one embodiment, the screenshot of FIG. 4 is produced by the system of FIG. 1 as a GUI for a user to display discovered characteristics and assigned names.

In the example shown in the example in FIG. 4, discovered characteristics (402) may comprise a UUID, a type, manufacturer, model. In the example shown in FIG. 4, a UUID such as "208667974" is an example of a unique name that is not intuitive/natural/user-friendly for natural language input. In the example shown in FIG. 4, examples of previously discovered device characteristics include:

Device Type: for example Camera, IR Blaster, Custom/manually Input, Microphone, Hub, Light, Remote, Streaming Box, and Music Player;
Manufacturer: using the manufacturer's name; and
Model: for example PJ2-3BRL-GXX-X01, Philips hue bridge 2015, LCA003, Roku Ultra, Sonos Beam, and Sonos One.

In the example shown in FIG. 4, assigned names and/or room/locations (404) may be determined for a device from discovered device characteristics. In the example shown in FIG. 4, examples of an assigned name (406) that is a unique name that is intuitive/natural/user-friendly for natural language input include: "Foscam camera", "Basement Apple TV" (television), "Basement DVD" (digital video disc), "Bedroom Apple TV", "Family Room TV", "Basement Front Area", "Basement Back Area", "Pico 1", "Pico 2", "Front Lamp", "Floor Lamp", "Back Lamp", "Garage Light", "Entry Light", "Family Room Roku", "Basement Roku", "Family Room Sonos Beam", "Basement Sonos Beam", and "Studio Sonos One".

In the example shown in FIG. 4, examples of room and/or location (408) that may be automatically discovered or automatically determined from discovered characteristics include: Front Yard, Basement, Master Bedroom, Family Room, Kitchen, Tech closet, Front Yard, and Studio.

FIG. 4 also has two examples of currently unassigned devices (410a), (410b). A first example (410a) is an automatically discovered IR Blaster from manufacturer Global Cache of model iTachWF2IR, which may be discovered using ARP scan, with MAC address 00:0c:1e:02:60:1d. A second example (410b) is an automatically discovered hub from manufacturer Philips of model Philips hue bridge 2015, which may be discovered using a Philips discovery technique with identified IP address 10.0.0.146. The default names of "iTachWF2IR (00:0c:1e:02:60:1d)" and/or "Philips hue (10.0.0.146)" are examples of unique names that are not intuitive/natural/user-friendly for natural language input. After the time of the screenshot of FIG. 4, an improved unique name may be automatically assigned using the disclosed.

Figure 5:
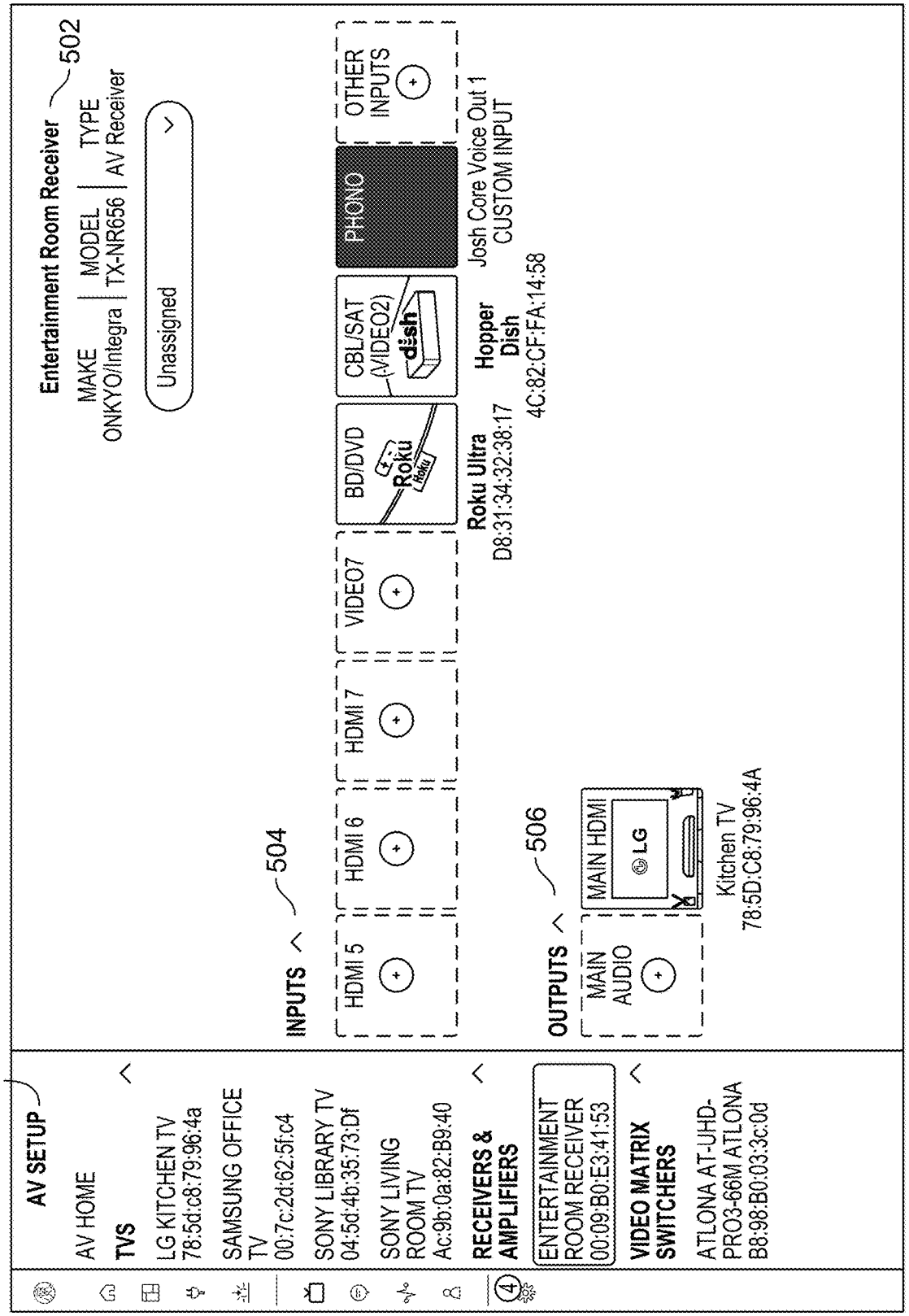
FIG. 5 is a screenshot illustrating an example of a portal to use assigned names to configure inter-device systems.

FIG. 5 is a screenshot illustrating an example of a portal to use assigned names to configure inter-device systems. In one embodiment, the screenshot of FIG. 5 is produced by the system of FIG. 1 as a GUI for a user to connect devices together.

In the example shown in the example of FIG. 5, an assigned name audio/video (AV) receiver called "Entertainment Room Receiver" (502) is a device that receives one or more audio/video source devices as input and provides power amplification and other effects to drive audio/video output devices. Configuring intra-device systems may use a portal such as shown in FIG. 5, but may also be updated using natural language input and assigned names. In the example of FIG. 5, inputs include assigned name "Roku Ultra" and "Hopper Dish" (504) and outputs include assigned name "Kitchen TV" (506). Using the portal and/or natural language input with assigned names, other devices may be configured to be an input or output with Entertainment Room Receiver (502) such as those listed (508) such as TVs "Samsung Office TV", "Sony Library TV", and "Sony Living Room TV".

Figure 6:
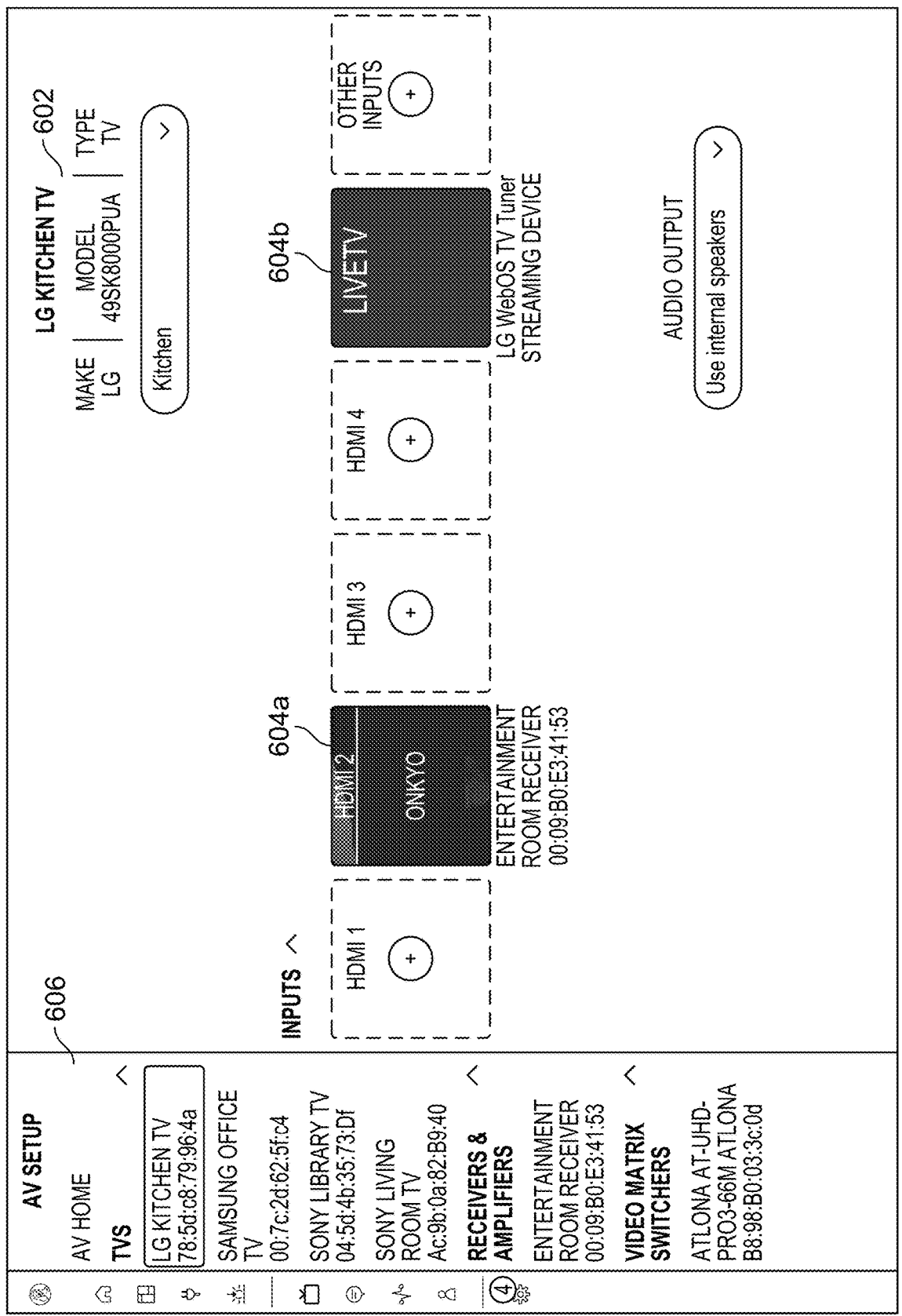
FIG. 6 is a screenshot illustrating an example of a portal to use assigned names to configure streaming device flow.

FIG. 6 is a screenshot illustrating an example of a portal to use assigned names to configure streaming device flow. As referred to herein, "streaming device flow" is the flow of devices that a multimedia streaming source such as a streaming service is connected to in sequence to get to one or more user(s). In one embodiment, the screenshot of FIG. 6 is produced by the system of FIG. 1 as a GUI for a user to configure streaming device flow.

In the example shown in the example of FIG. 6, an assigned name TV called "LG Kitchen TV" (602) is a device that receives one or more audio/video source devices as streaming input. Configuring streaming device flow may use a portal such as shown in FIG. 6, but may also be updated using natural language input and assigned names. In the example of FIG. 6, streaming inputs include assigned name "Entertainment Room Receiver" (604*a*) and "LG WebOS TV Tuner" (604*b*). Using the portal and/or natural language input with assigned names, other devices may be configured to be part of the streaming device flow such as those listed (606) such as TVs "Samsung Office TV", "Sony Library TV", and "Sony Living Room TV".

FIG. 7 is a screenshot illustrating an example of a portal to associate an assigned name to a device. In one embodiment, the screenshot of FIG. 7 is produced by the system of FIG. 1 as a GUI for a user to associated assigned names to devices.

A "ping" button is shown for each device, for example in FIG. 7 the ping button (702) is associated with a "Kitchen TV" (704) device. In one embodiment, when a user pushes the ping button (702) and/or uses natural language input to "ping the Kitchen TV", the screen of the Kitchen TV distinctly gives a message showing that it is currently the device being pinged. Without limitation, any output device may be pinged via a video, image, audio, or text message.

Figure 8:
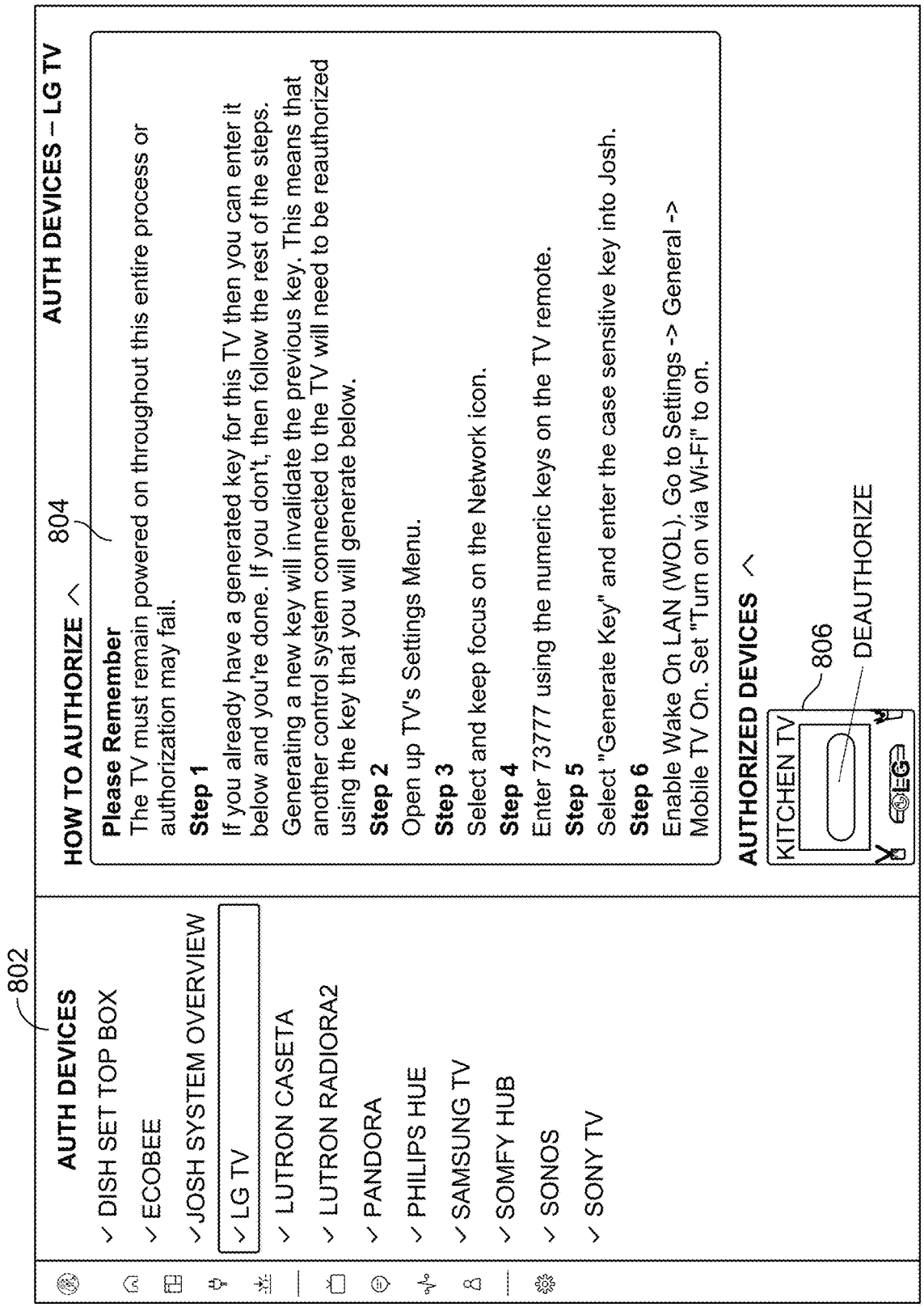
FIG. 8 is a screenshot illustrating an example of a portal to authorize a device with an assigned name.

FIG. 8 is a screenshot illustrating an example of a portal to authorize a device with an assigned name. In one embodiment, the screenshot of FIG. 8 is produced by the system of FIG. 1 as a GUI for a user to authorize devices. As referred to herein, an "authorization" is any process to authorize a device for use with a user, an API (application programming interface), a service, a network, another device, an input and/or an output.

For example, given a list of devices that may be authorized (802), a user may select the "LG TV" (804) for authorization. Either using the portal and/or a natural language input/output interface, a guide to authorization for the steps (if any) of manual intervention guides the user for the particular device. In the example of FIG. 8, the guide includes steps of:

Ensuring the TV remains powered during the entire process;
Receiving a generated key if it already exists;
If a generated key does not already exist, opening the TV setting menu, select network settings, enter a magic number on the TV remote, and request a generated key;
Utter the generated key either into the portal and/or the natural language input device; and/or
Enable Wake-On-LAN (WOL) and/or allow the device to be awakened via a network signal.

The portal and/or natural language interface allows existing authorized devices (806) to be deauthorized, for example when remove devices from the premises control system.

FIG. 9 is a screenshot illustrating an example of a portal to authorize a streaming device with an assigned name. In one embodiment, the screenshot of FIG. 9 is produced by the system of FIG. 1 as a GUI for a user to authorize streaming devices. In one embodiment, streaming authorization is also part of the streaming device flow of FIG. 6. For example, a TV may require an authorization from a streaming service to allow the streaming service to play on the TV using the user's credentials.

In the example given in FIG. 9, given a list of devices that may be authorized (901), a user may select the "Sonos" (902) for authorization. Either using the portal and/or a natural language input/output interface, a guide to authorization for the steps (if any) of manual intervention guides the user for the particular device. In the example of FIG. 9, the guide includes steps of:

Using a Sonos App to add streaming services and confirm they are received via the portal and/or natural language interface; and/or
For specialized streaming services such as Pandora, manually putting in credentials via the portal and/or natural language interface.

The portal and/or natural language interface shows the supported streaming services (904) and shows all the authorized streaming devices (906). In one embodiment, it also shows what is playing and/or with what streaming service on each device (906).

Figure 10:
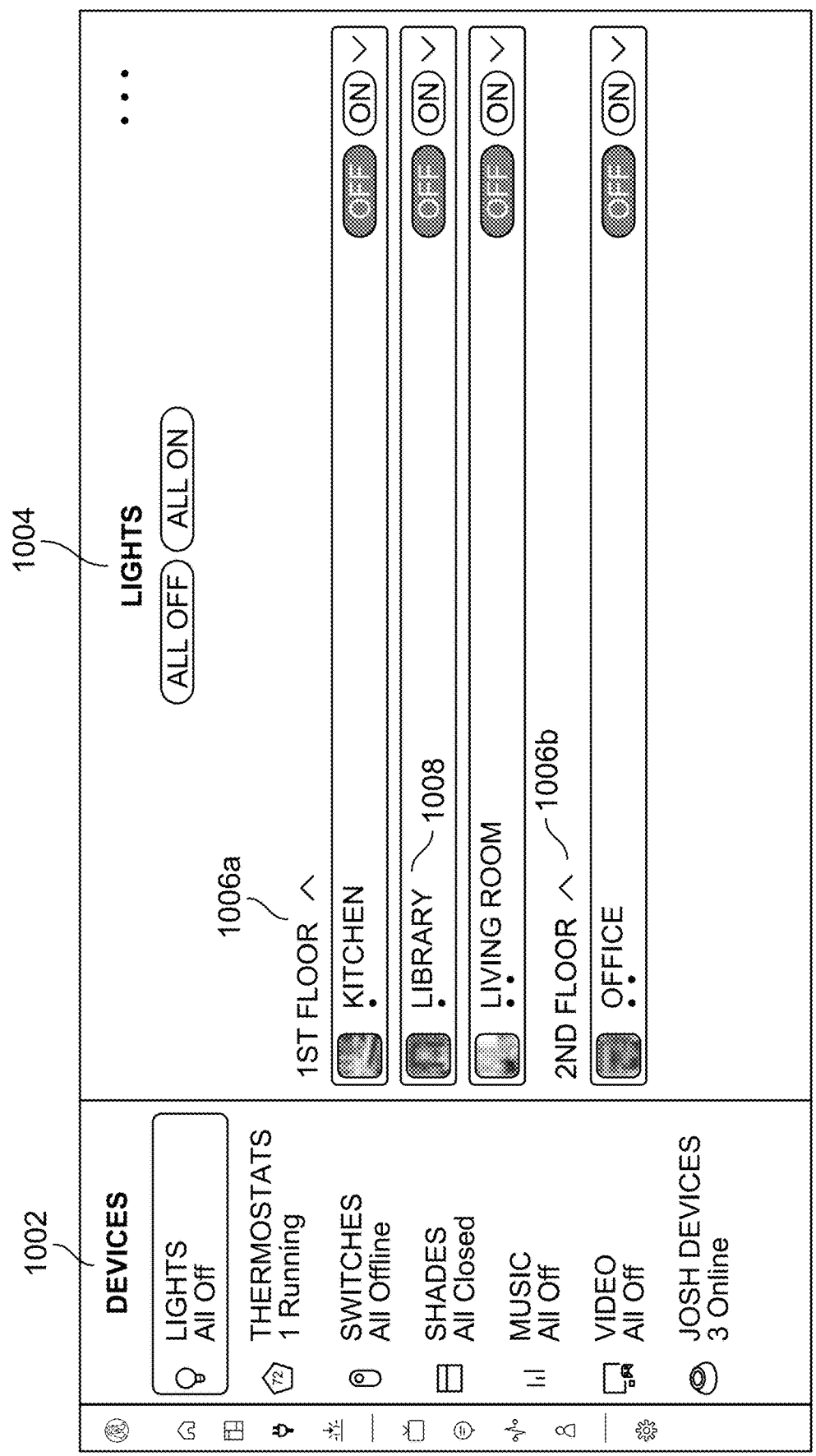
FIG. 10 is a screenshot illustrating an example of a portal to associate an assigned name to a device hierarchy model.

FIG. 10 is a screenshot illustrating an example of a portal to associate an assigned name to a device hierarchy model. In one embodiment, the screenshot of FIG. 10 is produced by the system of FIG. 1 as a GUI for a user to maintain a device hierarchy model. Without limitation, the model shown in the portal of FIG. 10 may also be accessed and changed using a natural language interface, for example by utterance.

In the example shown in FIG. 10, the set of devices (1002) may be shown as a list of device types: lights, thermostats, switches, shades, music, and/or video. Thus, an utterance "Turn off all the lights" may turn off all lights. For a set of appropriately assigned names where all lights have the term "light", "lamp", and similar terms such as "flood", this model permits a natural/intuitive/user-friendly way to access all lights efficiently.

For a given device type, for example lights (1004), the model may be further partitioned in hierarchy, for example using groups of rooms/locations such as "$1^{st}$ Floor" (1006*a*) and "$2^{nd}$ Floor" (1006*b*). Thus, an utterance "Turn off all the first floor lights" may turn off all lights in rooms on the 1st Floor, such as the Kitchen, Library, and Living Room for the example shown in FIG. 10. Each room such as the Library (1008) may be associated with a set of lights so that an utterance "turn off all the library lights" may turn off all lights in the library room.

Figure 11:
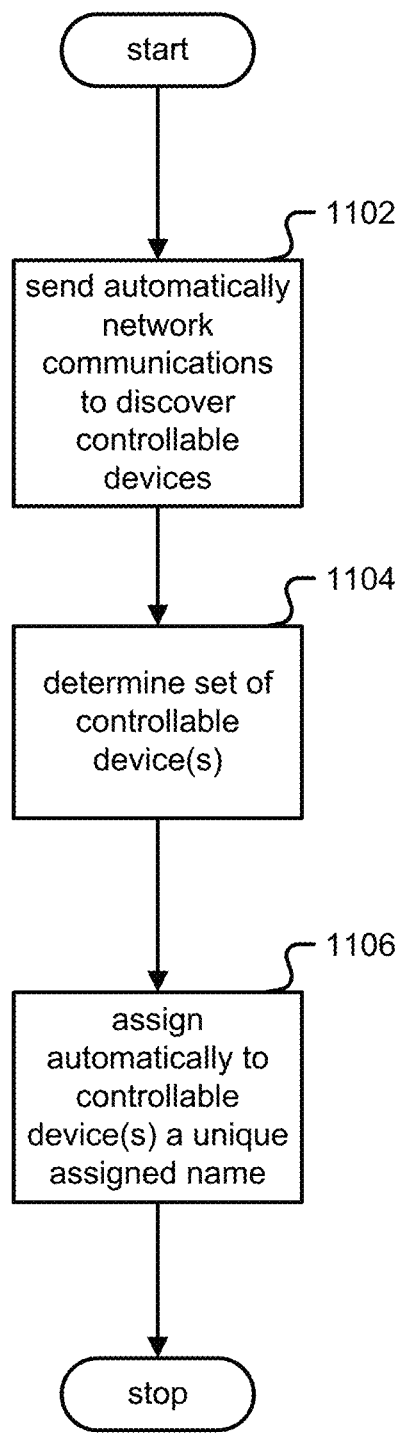
FIG. 11 is a flow diagram illustrating an embodiment of a process for device naming in premises control systems using automated device discovery.

FIG. 11 is a flow diagram illustrating an embodiment of a process for device naming in premises control systems using automated device discovery. In one embodiment, the process of FIG. 11 is carried out by the system (204) of FIG. 2A.

In step (1102), one or more network communications are sent automatically, for example via a communication interface, to discover one or more controllable devices on a network with which the premises automation system is associated. In one embodiment, a network communications comprises a discovery protocol.

In one embodiment, the discovery protocol conforms to at least of the following standards: UDP, ARP, AMX, ONVIF, mDNS, and SSDP. For example, many discovery protocol may be built upon UDP as a low-level network protocol, and/or UDP defines the type of network discovery packets and is convenient for multicast & broadcast transmissions, wherein other discovery protocols such as AMX, mDNS, and SSDP may define the content of the UDP packets.

In one embodiment, the discovery protocol is proprietary to a controllable device. In one embodiment, the discovery protocol comprises a query that only a subset of controllable devices can respond to. In one embodiment, one or more network communications comprise parallel probes, and wherein the processor is further configured to deduplicate parallel probe responses.

In one embodiment, parallel probes are launched separate threads for each discovery protocol. In one example, to search for Roku streaming devices, the system may launch a thread to query for a specific "SSDP service name". The query may include several UDP packets sent to a multicast address. Any Roku that is on the network will be listening for queries on this multicast address and respond. To search for Sony TVs, the system launches a thread to query for a different "SSDP service name". To search for Somfy shades, the system launches a thread to query for a specific Bonjour/mDNS service name. All of these threads for the Roku, Sony, and/or Somfy may be launched at system startup and run in parallel. Responses from devices are received asynchronously and may also processed in parallel.

In step (1104), a set of one or more controllable devices on the network is determined based at least in part on a response received from the one or more network communications.

In one embodiment, the response received comprises a received name/name characteristic not assigned by the premises automation system. In one embodiment, the received name/name characteristic is parsed to determine at least one of the following: a device type and a device location.

In one embodiment, the response received comprises a device name/name characteristic not assigned by the premises automation system. In one embodiment, the device name is parsed to determine a device type. In one embodiment, the device name is parsed to map the device type to at least one of the following device properties: device capabilities, device driver, and device control API/protocol. In one embodiment, the response including device manufacturer or a device model is parsed to determine at least one of the following device properties: device capabilities, device driver, and device control API/protocol.

In one embodiment, a model of a premises associated with the premises automation system is built at least in part on the received response. As referred to herein a "model" comprises one or more rooms, each with a corresponding room name and/or room type, such as a map. For example, as each device is discovered, the system may make contact with the device via its APIs to determine information about the device such as: device ID; device type; device name; room (if available); and/or floor (if available). The system may compare this against a known list of rooms and: create a room for this device, if one does not exist, and place the device in that room; and/or place the device in an existing room (either previously created by the user or a previously discovered device.) As more devices are discovered, a "map" of the building's rooms and floors may be progressively built.

In step (1106), each of the set of one or more controllable devices is automatically assigned to an assigned name that is unique within the premises automation system. In one embodiment, the assigned name encodes at least one of the following: a device location, a room, a device type, a device manufacturer, a device model, and a device vendor. In one embodiment, the assigned name is part of a naming convention that enables hierarchical control of devices based at least in part on one of the following: the device type, the location, the room type, and/or the device manufacturer. For example, an utterance "Turn off lights" in the hierarchical control based on device type turns off all lights over the entire house/premises. For example, an utterance "turn off Master Bedroom" in the hierarchical control based on room/location may turn off all devices in the Master Bedroom. For example, an utterance "turn off bedrooms" in the hierarchical control based on room type may turn off all devices in all bedrooms in the house/premises. For example, an utterance "turn off Sony" in the hierarchical control based on device manufacturer may turn off all Sony manufactured devices.

In one embodiment, the assigned name is "human friendly", wherein human friendly as referred to herein includes being human readable and/or human speakable. In one embodiment, a controllable device is controlled based at least in part on a voice command that includes an utterance of at least a part of the assigned name.

In one embodiment, assigning an assigned name that is unique comprises disambiguating, wherein disambiguating as referred to herein includes: disallowing an assigned name that is a device type; disallowing an assigned name that is a room name; appending a differentiator if another assigned device is in a similar domain; differentiating by including a manufacturer name in the assigned name; and differentiating by including a room name in the assigned name.

In one embodiment, an administrative GUI is displayed, wherein the administrative GUI presents at least one of the following: automatically assigned names, automatically assigned rooms; mapping streaming flows (as shown in FIG. 5 and FIG. 6); pinging locations (as shown in FIG. 7); authorization (as shown in FIG. 8 and FIG. 9); receiving updates from a user; and receiving corrections from the user.

Figure 12:
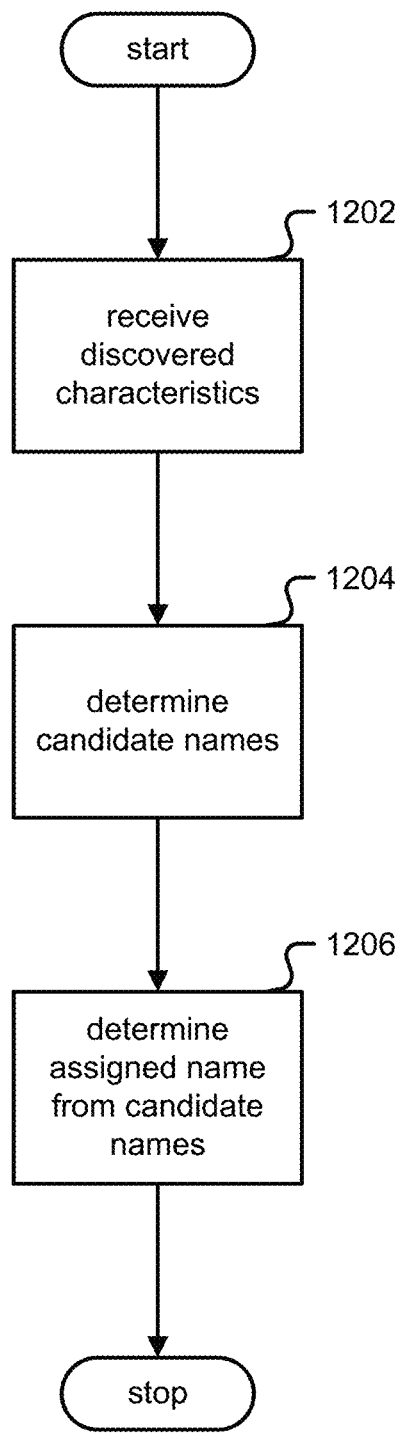
FIG. 12 is a flow diagram illustrating an embodiment of a process for assigning device names in premises control systems.

FIG. 12 is a flow diagram illustrating an embodiment of a process for assigning device names in premises control systems. In one embodiment, the process of FIG. 12 is carried out by the system (204) of FIG. 2A. In one embodiment, the process of FIG. 12 is part of step (1106) of FIG. 11.

In one embodiment, a natural language input device is used. In one embodiment, the natural language input device comprises an audio input device or a mobile input device.

In step (1202), one or more discovered characteristics for a controllable device are received. In one embodiment, discovered characteristics for the premises control output device comprise at least one of the following: device name; device manufacturer; device model; and device room.

In step (1204), one or more candidate utterance names for the natural language input device to reference the controllable device are determined based at least in part on the discovered characteristics.

In step (1206), an assigned name for the natural language input device to reference the controllable device is determined from the candidate utterance names at least in part by considering devices, rooms, and common device types of the premises control system.

Figure 13:
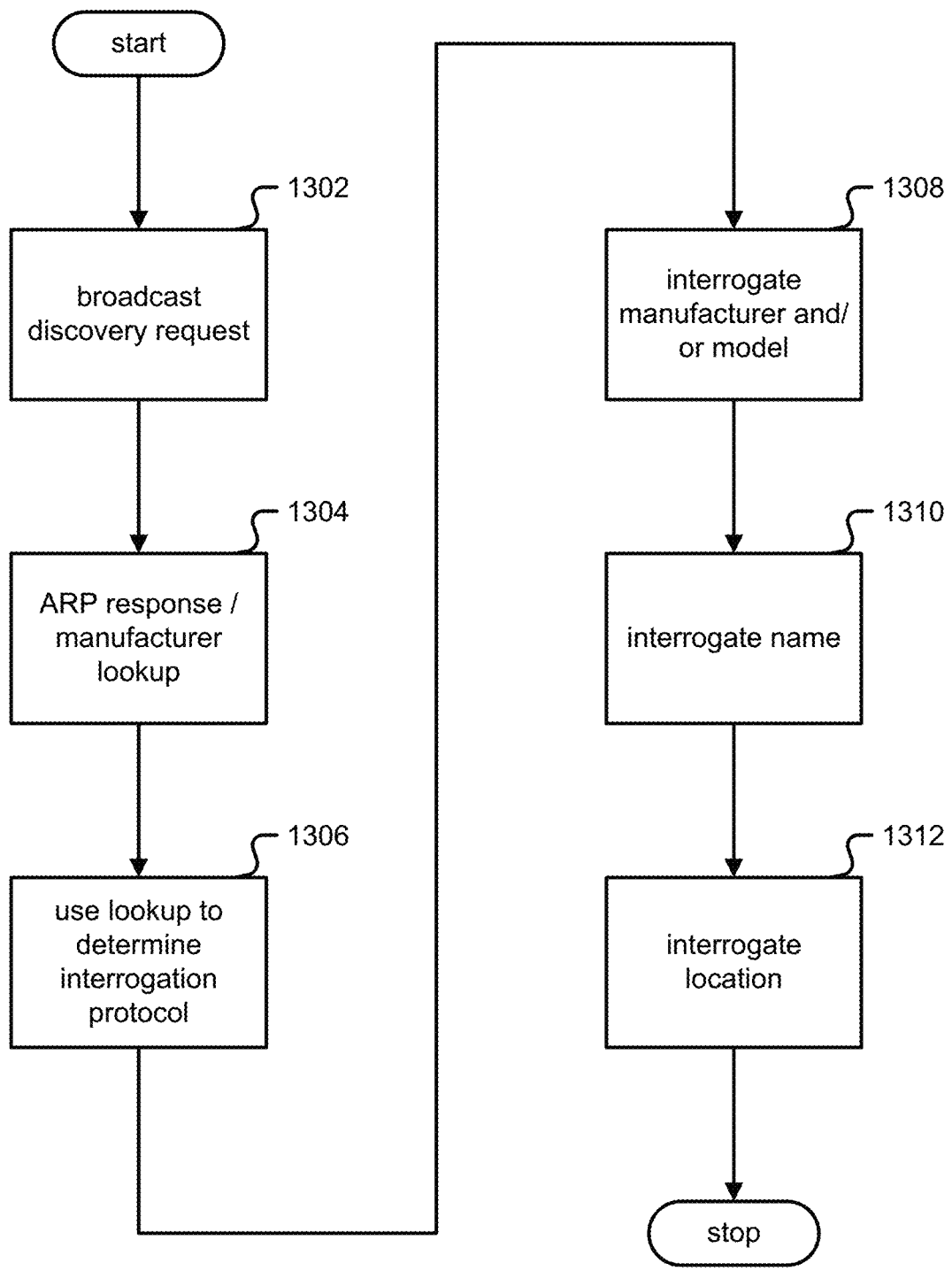
FIG. 13 is a flow diagram illustrating an embodiment of a process for receiving characteristics in premises control systems.

FIG. 13 is a flow diagram illustrating an embodiment of a process for receiving characteristics in premises control systems. In one embodiment, the process of FIG. 13 is carried out by the system (204) of FIG. 2A. In one embodiment, the process of FIG. 13 is part of step (1102) of FIG. 11 and/or (1202) of FIG. 12.

In step (1302) a discovery request is made, for example an ARP Broadcast request and/or an ARP Unicast request. The request may be made from device (204) of FIG. 2A based on a fixed and/or dynamic frequency and/or based on response to an event. The discovery request of step (1302) may be optional in the case of a device that announces itself when first joining a network.

In step (1304), a response from the request of step (1302) is used at least in part to determine at least one characteristic, including a manufacturer of one or more newly discovered devices. For example, if the discovery request (1302) is an ARP request, the response (1304) may be a MAC address which may be used via lookup table to determine the manufacturer. For example, the system may keep a list of MAC address ranges and company names known traditionally as an OUI (Organizationally Unique Identifier) table, for example those registered with the IEEE standards body (Institute of Electrical and Electronics Engineers) and may be public information. For example if a device has a MAC address of "78:28:ca:1e:dc:ba", it is manufactured by Sonos Inc.

In step (1306), the manufacturer characteristic is used to determine an associated interrogation protocol. In some cases, from the manufacturer characteristic it may be determined there is no further interrogation protocol beyond the discovery request (1302). In other cases an associated interrogation protocol may include AMX, ONVIF, mDNS, and SSDP.

For example, discovery protocols like SSDP, mDNS, and AMX are "query/response" protocols. The system may ask "who is out there", typically via UDP multicast or broadcast packets, and the devices that are listening for requests of this type respond and contact the system to make themselves known. ARP may not be required for the above protocols.

In one embodiment, for devices that do not implement one of these types of discovery protocols the system may use ARP as an alternate way to find devices. ARP discovery may include: ARP scanning to build up a list of IP and MAC addresses on the network; for each entry found in the ARP table, the system performs an OUI lookup to get the manufacturer; for the manufacturers that the system is interested in and/or aware of, the device is probed to confirm it is the type of device that the system knows how to communicate with. This probe may take the form of checking for an open TCP port or an HTTP request to an API URL, or some other mechanism including a network mechanism. In the event the probe is successful, the system may know how to talk to the device and may start interrogating the device for its characteristic information.

In step (1308), the associated interrogation protocol may be used to further interrogate the new device for other characteristics, for example to confirm the manufacturer and determine a model. In one embodiment, a flow may takes the form of:

Send out discovery queries to see what devices respond. For any devices that respond, some information about the device may be available in the response itself. More information may then be obtained by connecting to the device via its native APIs; and/or Scan the ARP table for new devices that match particular manufacturers;

For each new device in the ARP table with a matching manufacturer, probe the device to confirm it is a supported device; and If the device probes successfully, the device is directly contacted, using its native APIs, to get more information.

Once direct contact has been made, the system may establish one or more discovered characteristics:

The device's IP and MAC address;
The device's manufacturer;
The device's model;
The device's unique ID;
The device's name(s); and/or
The device's location (room/floor) if available.

The device's name, room and floor information may be augmented and/or corrected based on the name provided, the type of device, and existing rooms in the system. In the event there is no further interrogation protocol beyond the discovery request (1302), the MAC address may be used to determine a model via such native API.

In step (1310), if available the interrogation protocol is used to determine a "name characteristic", referred to herein as a manufacturer provided device name or existing device name. Note that the name characteristic provided by the manufacturer may be different from the final assigned name. For example, an interrogated device name/name characteristic may be "Lutron Lamp 8A02YY". The name may be used to place the device in a room if the name itself encodes room/floor information.

In step (1310), if available the interrogation protocol is used to determine a location characteristic, for example a floor or a room. For example, an interrogated device may say it is in the "Pantry Room" on the 1st floor and a second interrogated device may say it is in the "Pantry". The system may recognize that both are referring to the same room and place the devices into a single room.

In one embodiment, any characteristics received via FIG. 13 during discovery may be incorporated to device naming. In one embodiment, device naming starts from a manufacturer provided device name and may be further enhanced by leveraging other characteristics to produce a device name that is unique across the system while remaining user friendly.

Figure 14:
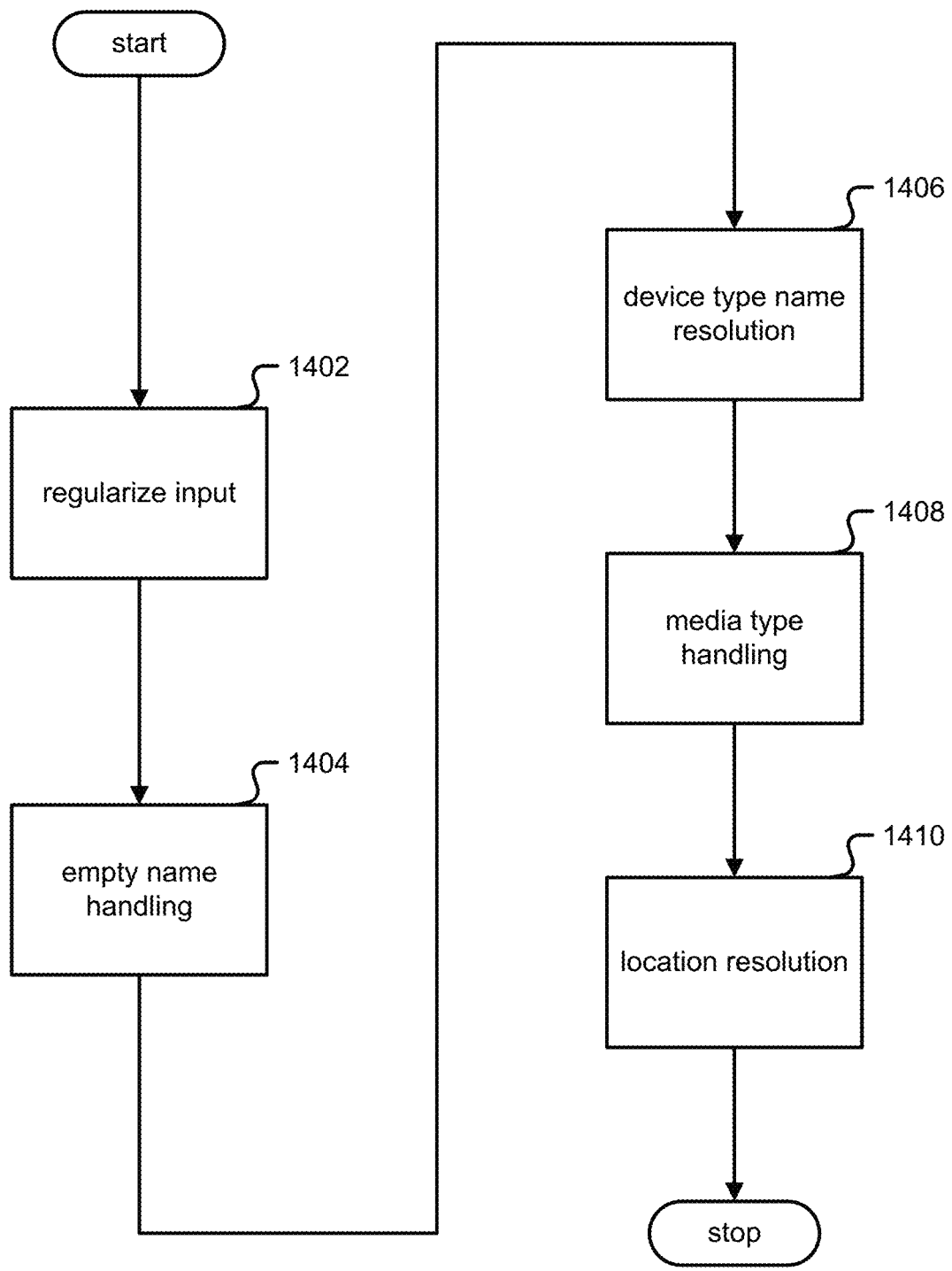
FIG. 14 is a flow diagram illustrating an embodiment of a process for determining candidate utterance names in premises control systems.

FIG. 14 is a flow diagram illustrating an embodiment of a process for determining candidate utterance names in premises control systems. In one embodiment, the process of FIG. 14 is carried out by the system (204) of FIG. 2A. In one embodiment, the process of FIG. 14 is part of step (1204) of FIG. 12.

In step (1402), input is regularized. As referred to herein, "regularized" is the transforming of data from its input domain to the domain a system operates within. This may allow consistent display within a GUI and/or aids in string matching when parsing user commands. In one embodiment, regularizing input comprises:

1) Replacing tabs, newlines, and Unicode whitespace with simpler ASCII space;
2) Trimming whitespace from the start and end of the name; and/or
3) Replace any Unicode quotes and apostrophes with ASCII equivalents.

In step (1404), empty names are handled. Some devices may not return a name characteristic. Other devices may be discovered with no suggested name from the manufacturer. In one embodiment, drivers in the system (204) of FIG. 2A substitute in fields like model or a fixed string for the manufacturer suggested name where empty. For an empty name case, the system may start with the name "Unknown" if the name from discovery is empty.

In step (1406), device type name resolution handles a device type "clash", referred to herein when naming is ambiguous, for example a namespace collision with two similar names. An example of ambiguity is when a device name clashes with a device type: Consider a device named "LIGHTS"; when the user issues the command "Turn off the lights", it may be ambiguous whether they intend all the lights to go off or only that particular device to go off. Referring to a device name as a singular or plural device type name is thus a clash. In one embodiment, to avoid these ambiguities, devices are prevented from being named for device types or any common alias for a device type, for example "chandelier" or "blackout" also accounting for pluralization "chandeliers" or "blackouts".

In one embodiment, the device name augmentation depends on data available on discovery. Examples of uttered commands that are appropriate based on device type:

"Listen to the Beatles"→the system (204) finds all music players, determines the current room/location for the user uttering the phrase (or uses an uttered room name if supplied in command), searches the music services available for "the Beatles" as an artist/album/track, then enqueues a playlist onto available music player(s) at that room/location and presses "play". Examples of valid uttered commands for music players include "listen", "play", "pause", "next", "previous", and "volume";

"What is the volume"→the system (204) finds all music/video/multimedia devices, with a volume control/widget, determines the current room/location for the user uttering the phrase (or uses an uttered room name if supplied in command), and sends the "get volume" command to the music/video/multimedia devices at that room/location;

"Turn on the lights"→the system (204) finds all lights, determines the current room/location for the user uttering the phrase (or uses an uttered room name if supplied in command), and sends the "on" command to those lights at that room/location;

"Set the lights to green"→the system (204) finds all colored lights, determines the current room/location for the user uttering the phrase (or uses an uttered room name if supplied in command), and sends the "set color" command to those colored lights at that room/location. Examples of valid uttered commands for lights are "on", "off", "brightness", "color", "temperature", "vibrancy". Which commands the lights support are determined at discovery time (1102) for each light;

"Open the shades"→the system (204) finds all shades, determines the current room/location for the user uttering the phrase (or uses an uttered room name if supplied in command), and sends the set level command to those shades at that room/location. Examples of valid uttered operations for shades are "open", "close", "set level to x %".

As described above, the system (204) looks up devices that can satisfy a command, based on their type, in a location, then sends the appropriate API calls to those particular devices.

If a room is known, the room name may be used as a prefix. Rooms may be associated with discovery of project-based subsystems like other control systems. For example, "Lamp" may become "Bedroom Lamp". Otherwise, the manufacturer name may be used as a prefix, for example "Lamp" may become "Lutron Lamp".

In step (1408), media type special handling is done. Media devices, for example Amplifiers, Receivers, Matrix Switchers, Music Players, Set Top Boxes, and TVs, are often named by the manufacturing flow for the room they are in, however in certain user interface sequences the room may not be explicitly known on discovery. For example, consider a TV discovered via SSDP where the name characteristic is Bedroom, but there is no room field. If this name were permitted unaltered at this stage of discovery it may consume room names for rooms that may be created later on in the discovery or configuration process. In one embodiment, in anticipation of this, the system (204) augments the name of a media device by appending its manufacturer. First, there are several conditions when not to append the manufacturer, such as:

The manufacturer is not known;
The manufacturer is the same as that of the home control system;
The manufacturer already appears in a device name; and/or
The device name characteristic contains a common media type (e.g. tv, projector, display, player)

If none of these apply, the algorithm may append the manufacturer to the device name, for example "Bedroom" may become "Bedroom Roku".

Because media devices are less commonly referred to directly by name, having the manufacturer in the final device name does not necessarily diminish a user's ability to utter commands. Media devices may require some user configuration, such as authorization or AV routing. Having the manufacturer in the name simplifies user cognitive load in the configuration process when there are several devices presented in a GUI.

In step (1410), location resolution handles a room/location "clash". This ambiguity is when a device name clashes with a room name. For example, consider a room named "Bedroom" and a shade device named "Bedroom". If such an ambiguity exists, when the user utters the command "Turn off the Bedroom", it is ambiguous whether they intend all devices in the room to turn off, or the fireplace device to turn off. To resolve this ambiguity, the system (204) checks for a room existing with the proposed device name. If there is a clash, the name is suffixed with the device type, for example "Bedroom" becomes "Bedroom Shade".

Note that in the order shown in FIG. 14, this may apply more to environmental devices such as Lights, Shades, and Thermostats, as media devices may typically be augmented with the manufacturer in step (1408) resulting in a name unlikely to clash with a room in the premises control system.

After all the steps of FIG. 14, the system (204) may now enforce uniqueness. In one embodiment, uniqueness enforcement may occur at step (1206) of FIG. 12. Thus, after the steps of FIG. 14 the system (204) has resolved device type and room name ambiguities. The final device name is ensured to be more unique across all other devices:

If the name does not clash with any other device name, the name is considered valid and the autodiscovery of step (1206) is complete;

If the name is not unique, the room is known, and the device name does not already start with the room name, the system (204) prepends the room name, for example "Sony TV" becomes "Bedroom Sony TV";

If the name is still not unique, the system (204) adds an incrementing numeral to the end until is unique. For example, consider a home with one occupancy sensor in the Kitchen and two occupancy sensors in the Great Room, all with name characteristic "Motion". The Kitchen sensor unique name is "Motion". The first Great Room sensor unique name is "Great Room Motion". The second Great Room sensor unique name is "Great Room Motion 2".

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A premises automation system, comprising:
a communication interface; and
a processor coupled to the communication interface and configured to:
send automatically, via the communication interface, one or more network communications to discover one or more controllable devices on a network with which the premises automation system is associated;

determine a set of one or more controllable devices on the network based at least in part on a response received from said one or more network communications;

determine a discovered characteristic for a specific controllable device in the set of one or more controllable devices, based at least in part on the response received from said one or more network communications;

regularize a character string associated with the discovered characteristic, wherein regularizing the character string comprises at least one of the following: replacing tabs with ASCII space; replacing newlines with ASCII space; replacing Unicode whitespace with ASCII space; trimming whitespace from the start of the character string; trimming whitespace from the end of the character string; replacing Unicode quotes with ASCII quotes; and replacing Unicode apostrophes with ASCII apostrophes;

determine one or more candidate utterance names for a natural language input device to reference the specific controllable device, based at least in part on the regularized character string; and assign automatically to each of said set of one or more controllable devices an assigned name that is unique within the premises automation system.

2. The premises automation system of claim 1, wherein a network communications comprises a discovery protocol, and wherein the discovery protocol conforms to at least of the following standards: UDP, ARP, AMX, ONVIF, mDNS, and SSDP.

3. The premises automation system of claim 1, wherein a network communications comprises a discovery protocol, and wherein the discovery protocol is proprietary to a controllable device.

4. The premises automation system of claim 1, wherein a network communications comprises a discovery protocol, and wherein the discovery protocol comprises a query that only a subset of controllable devices can respond to.

5. The premises automation system of claim 1, wherein said one or more network communications comprise parallel probes, and wherein the processor is further configured to deduplicate parallel probe responses.

6. The premises automation system of claim 1, wherein the response received comprises a received name not assigned by the premises automation system, and wherein the processor is further configured to parse the received name to determine at least one of the following: a device type and a device location.

7. The premises automation system of claim 1, wherein the response received comprises a device name not assigned by the premises automation system, and wherein the processor is further configured to: parse the device name to determine a device type; and map the device type to at least one of the following device properties: device capabilities, device driver, and device control API/protocol.

8. The premises automation system of claim 1, wherein the processor is further configured to build a model of a premises associated with the premises automation system, and wherein the model comprises one or more rooms, each with a corresponding room name.

9. The premises automation system of claim 1, wherein the processor is further configured to build a model of a premises associated with the premises automation system, and wherein the model comprises one or more rooms, each with a corresponding room type.

10. The premises automation system of claim 1, wherein the assigned name encodes at least one of the following: a device location, a room, a device type, a device manufacturer, a device model, and a device vendor.

11. The premises automation system of claim 1, wherein: the assigned name encodes at least one of the following: a device location, a room, a room type, a device type, a device manufacturer, a device model, and a device vendor; and wherein the assigned name is part of a naming convention that enables hierarchical control of devices based at least in part on one of the following: the device type; the room; the room type; and the device manufacturer.

12. The premises automation system of claim 1, wherein the assigned name is human friendly, comprising at least one of the following: human readable and human speakable.

13. The premises automation system of claim 1, wherein the processor is further configured to control a controllable device based at least in part on a voice command that includes an utterance of at least a part of the assigned name.

14. The premises automation system of claim 1, wherein the response received comprises a device manufacturer or a device model, and wherein the processor is further configured to: parse the response to determine at least one of the following device properties: device capabilities, device driver, and device control API/protocol.

15. The premises automation system of claim 1, wherein assigning an assigned name that is unique comprises disambiguating, wherein disambiguating comprises at least one of the following: disallowing an assigned name that is a device type; disallowing an assigned name that is a room name; appending a differentiator if another assigned device is in a similar domain; differentiating by including a manufacturer name in the assigned name; and differentiating by including a room name in the assigned name.

16. The premises automation system of claim 1, wherein the processor is further configured to display an administrative graphical user interface (GUI), wherein the administrative GUI presents at least one of the following: automatically assigned names, automatically assigned rooms; mapping streaming flows; receiving updates from a user; and receiving corrections from the user.

17. The premises automation system of claim 1, further comprising a natural language input device coupled to the processor; and wherein assigning the assigned name comprises: receiving one or more discovered characteristics for a controllable device; determining candidate utterance names for the natural language input device to reference the controllable device based at least in part on the discovered characteristics; and determining an assigned name for the natural language input device to reference the controllable device from the candidate utterance names at least in part by considering devices, rooms, and common device types of the premises control system.

18. The system of claim 17, wherein the natural language input device comprises an audio input device or a mobile input device.

19. The system of claim 17, wherein discovered characteristics for the premises control output device comprises at least one of the following: device name; device manufacturer; device model; and device room.

20. The system of claim 17, wherein determining candidate utterance names comprises at least one of the following: regularizing character strings associated with the one or more discovered characteristics; handling empty names associated with the one or more discovered characteristics; resolving clashing device types; handling media types associated with the one or more discovered characteristics; resolving clashing room names; and enforcing uniqueness from the candidate utterance names at least in part by enforcing uniqueness across all devices, rooms, and common device types of the premises control system.

21. A method, comprising:
sending automatically one or more network communications to discover one or more controllable devices on a network with which a premises automation system is associated;
determining a set of one or more controllable devices on the network based at least in part on a response received from said one or more network communications;
determining a discovered characteristic for a specific controllable device in the set of one or more controllable devices, based at least in part on the response received from said one or more network communications;
regularizing a character string associated with the discovered characteristic, wherein regularizing the character string comprises at least one of the following: replacing tabs with ASCII space; replacing newlines with ASCII space; replacing Unicode whitespace with ASCII space; trimming whitespace from the start of the character string; trimming whitespace from the end of the character string; replacing Unicode quotes with ASCII quotes; and replacing Unicode apostrophes with ASCII apostrophes;
determining one or more candidate utterance names for a natural language input device to reference the specific controllable device, based at least in part on the regularized character string; and
assigning automatically to each of said set of one or more controllable devices an assigned name that is unique within the premises automation system.

22. A computer program product embodied in a non-transitory computer readable medium and comprising computer instructions for:
sending automatically one or more network communications to discover one or more controllable devices on a network with which a premises automation system is associated;
determining a set of one or more controllable devices on the network based at least in part on a response received from said one or more network communications;
determining a discovered characteristic for a specific controllable device in the set of one or more controllable devices, based at least in part on the response received from said one or more network communications;
regularizing a character string associated with the discovered characteristic, wherein regularizing the character string comprises at least one of the following: replacing tabs with ASCII space; replacing newlines with ASCII space; replacing Unicode whitespace with ASCII space; trimming whitespace from the start of the character string; trimming whitespace from the end of the character string; replacing Unicode quotes with ASCII quotes; and replacing Unicode apostrophes with ASCII apostrophes;
determining one or more candidate utterance names for a natural language input device to reference the specific controllable device, based at least in part on the regularized character string; and
assigning automatically to each of said set of one or more controllable devices an assigned name that is unique within the premises automation system.

23. The system of claim 1, wherein determining candidate utterance names comprises regularizing character strings associated with the one or more discovered characteristics.

24. The system of claim 1, wherein determining candidate utterance names comprises handling empty names associated with the one or more discovered characteristics.

25. The system of claim 1, wherein determining candidate utterance names comprises resolving clashing device types.

26. The system of claim 1, wherein determining candidate utterance names comprises resolving clashing room names.

* * * * *